US011279266B2

United States Patent
Stichter et al.

(10) Patent No.: US 11,279,266 B2
(45) Date of Patent: Mar. 22, 2022

(54) MOTOR HOME CHAIR LIFT

(71) Applicant: Newmar Corporation, Nappanee, IN (US)

(72) Inventors: Jim Stichter, Goshen, IN (US); Steve Hulse, Nappanee, IN (US); Steve Wolf, Milford, IN (US)

(73) Assignee: Newmar Corporation, Nappanee, IN (US)

( * ) Notice: Subject to any disclaimer, the term of this patent is extended or adjusted under 35 U.S.C. 154(b) by 123 days.

(21) Appl. No.: 16/501,243

(22) Filed: Mar. 11, 2019

(65) Prior Publication Data

US 2020/0290487 A1 Sep. 17, 2020

(51) Int. Cl.
*B60N 2/24* (2006.01)
*B60N 2/16* (2006.01)
*B60P 3/32* (2006.01)
*A61G 3/06* (2006.01)

(52) U.S. Cl.
CPC .............. *B60N 2/24* (2013.01); *B60N 2/1635* (2013.01); *A61G 3/062* (2013.01); *B60P 3/32* (2013.01)

(58) Field of Classification Search
CPC ........... B60N 2/24; B60N 2/1635; B60P 3/32; A61G 3/062
USPC ...................................................... 296/65.15
See application file for complete search history.

(56) References Cited

U.S. PATENT DOCUMENTS

| | | | | |
|---|---|---|---|---|
| 3,710,962 A | * | 1/1973 | Fowler, Jr. ............ | B60P 1/4421 414/545 |
| 5,630,638 A | * | 5/1997 | Hirasawa ............... | B60N 2/245 296/65.07 |
| 7,316,441 B2 | * | 1/2008 | Iwatani .................. | B60N 2/067 296/65.12 |
| 7,401,857 B2 | * | 7/2008 | Laux ....................... | B60N 2/06 297/188.04 |
| 2004/0022614 A1 | * | 2/2004 | Anderson .............. | A61G 3/062 414/540 |

* cited by examiner

*Primary Examiner* — D Glenn Dayoan
*Assistant Examiner* — Dana D Ivey
(74) *Attorney, Agent, or Firm* — Faegre Drinker Biddle & Reath LLP

(57) ABSTRACT

A motor home seat lift apparatus is provided which is located within the vehicle at the front passenger door, which is foldable to a storage location adjacent to the dashboard and forward of the front passenger seat, and which unfolds for usage to place a lift seat adjacent to the level of the front passenger seat, from which a user can slide onto (or off of) the lift seat. The lift seat is then movable from the that level, downward and outward through the opened front passenger door, to a level comfortably adjacent the ground level, for the user to then stand upon when exiting the lift seat. In general, the apparatus includes a lift seat which moves laterally within the vehicle into and out of the door, and rotates up and down between the exterior ground level and the passenger seat level, above the passenger compartment floor. The lift seat is also rotatable during this lateral and rotational motion, so that the user can be comfortably reoriented to face the direction of motion and avoid impact with other vehicle structure.

20 Claims, 21 Drawing Sheets

MOTOR HOME CHAIR LIFT

BACKGROUND OF THE INVENTION

The present invention relates generally to motorized recreational vehicles, such as motor homes, and more particularly, to apparatus for assisting persons of limited mobility to enter and exit from motor homes.

In general, motor homes tend to be larger vehicles, with a passenger compartment that is elevated above the ground at levels higher than those used in normal automobiles. Motor homes also include living quarters therein, typically laid out in a floor plan set to the rear of the front driving area. That front driving area typically includes a front window and dashboard area immediately behind the window, a driver's seat and a front passenger seat beside the driver's seat, both seats being behind the dashboard area, and a door by which the users and enter and leave the vehicle. That door is typically adjacent the front passenger's seat. In Class A motor homes (as defined, for example, in the standards set by the Recreational Vehicle Industry Association), there are typically steps extending through the door area, upward from the exterior ground level to the level of the floor of the passenger compartment within the vehicle. In typical Class A motor homes, that floor is the base upon which the front passenger seat is mounted, and that floor also extends rearward to form the floor of the living quarters. While there may also be other doors to the passenger compartment, that front passenger door typically forms a main door for users to enter and exit the motor home, requiring users to negotiate a plurality of steps up and down when doing so.

However, for persons of limited mobility (due to medical issues, age, fatigue, size, etc.), climbing up and down those steps can be more difficult than is desirable. Various solutions have been previously proposed to aid such persons in user motor vehicles, and even motor homes in particular. Some prior apparatus have involved the use of a second, supplemental side door in the vehicle which was enlarged, compared to the front passenger door, either to facilitate entrance by virtue of the second door size and/or accommodate a special lifting mechanism which could automatically elevate the person from the ground level to the passenger floor level. However, using such methods in a motor home can require significant modification to vehicle frame structure and/or the floor plan of the living area, and can significantly reduce floor plan functionality and/or certain desirable features of the living quarters. Moreover, some of those type of prior lifting mechanisms required mounting elements on the exterior of the vehicle, which would significantly detract from the aesthetics of a motor home (and reduce its resale value where the lift mechanism was not needed by the subsequent purchaser), and which can significantly increase vehicle maintenance costs, due to environmental exposure of those exterior elements. Further, some of those type of prior lifting mechanisms required significant storage space of components on the interior of the living area, where space is at a premium. In addition, such prior lifting mechanisms tended to be heavy, bulky, and expensive to manufacture, install, and maintain. Such significant extra weight on the vehicle has obvious fuel economy disadvantages as well.

Alternatively, it has previously been suggested to provide lifting mechanisms to aid user entrance at the front passenger door lift devices which move persons from the ground level to the passenger floor level and/or through that door, and into a position adjacent the front passenger seat. However, such prior devices have tended to be heavy and/or require extra reinforcement of the vehicle frame, at least near the door. These devices also tend to require mounting elements on the exterior of the vehicle. Where such lifting devices are separate from the front passenger seat, problems can arise when they are not being used, since these devices can be bulky and tend to obstruct the passenger view through the windshield and/or movement within the vehicle and/or limit normal passageway through the front passenger door, up and down the steps. Certain of such devices can also require assembly and/or removal of structural components for each usage. Given the limited space available within a motor home, that procedure can be disadvantageous. On the other hand, when such lifting devices are incorporated into the front passenger seat (such as where that seat is itself moved into and out of the front passenger door), extensive structural modification of the vehicle frame and/or the passenger seat is needed, which is expensive to manufacture and maintain. In addition, the extension and retraction mechanisms of certain of these prior lifting apparatus have an increased potential for component jamming, user injury, and debris accumulation within the vehicle, due to the component articulation during use.

Objectives of the Invention

Accordingly, a primary objective of this invention is to provide improvements to chair lift apparatus for use with motor homes and other vehicles having an elevated passenger compartment. These improvements include providing apparatus which:

a. are inexpensive to manufacture and maintain,
b. can be applied to existing motor home floor plans and/or do not require extensive modification of the vehicle,
c. are mounted and stored completely within the vehicle,
d. minimize component weight,
e. facilitate use for entrance and egress of the vehicle,
f. minimize storage space requirements and obstruction to normal vehicle use, and
g. are operationally reliable for extended periods of time.

SUMMARY OF THE INVENTION

These and other objectives of the present invention are achieved by the provision of a motor home apparatus located within the vehicle at the front passenger door, which is foldable to a storage location adjacent to the dashboard and forward of the front passenger seat, and which unfolds for usage to place a lift seat adjacent to the level of the front passenger seat, from which a user can slide onto (or off of) the lift seat. The lift seat is then movable from that level, downward and outward through the opened front passenger door, to a level comfortably adjacent the ground level, for the user to then stand upon when exiting the lift seat. In general, the apparatus includes a lift seat which moves laterally within the vehicle into and out of the door, and rotates up and down between the exterior ground level and the passenger seat level, above the passenger compartment floor. The lift seat is also rotatable during this lateral and rotational motion, so that the user can be comfortably reoriented to face the direction of motion and avoid impact with other vehicle structure.

Other objects, advantages, and novel features of the present invention will become readily apparent from the following drawings and detailed description of certain preferred and alternative embodiments.

Figure 1:
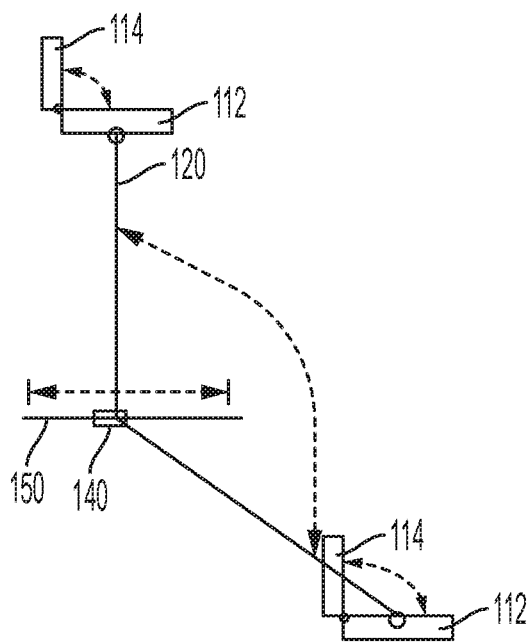
FIG. 1 shows a schematic side view of the primary seat lift motion during use of an apparatus according to the teachings of the present invention.
Figure 2:
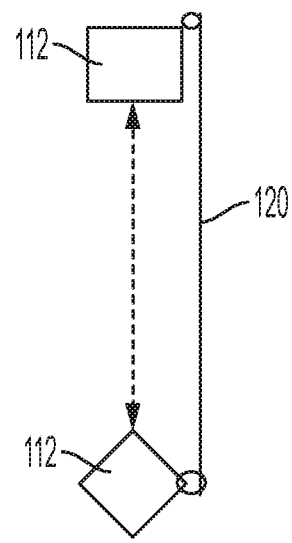
FIG. 2 shows a schematic top view of the primary seat lift motion during use of the apparatus according to the teachings of the present invention.
Figure 3:
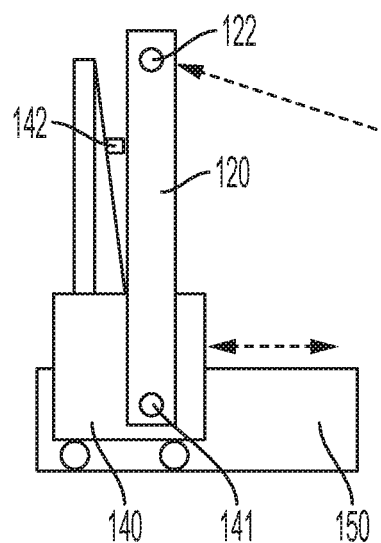
FIG. 3 shows a schematic side view of the primary seat lift motion during use of a preferred embodiment of the present invention.
Figure 4:
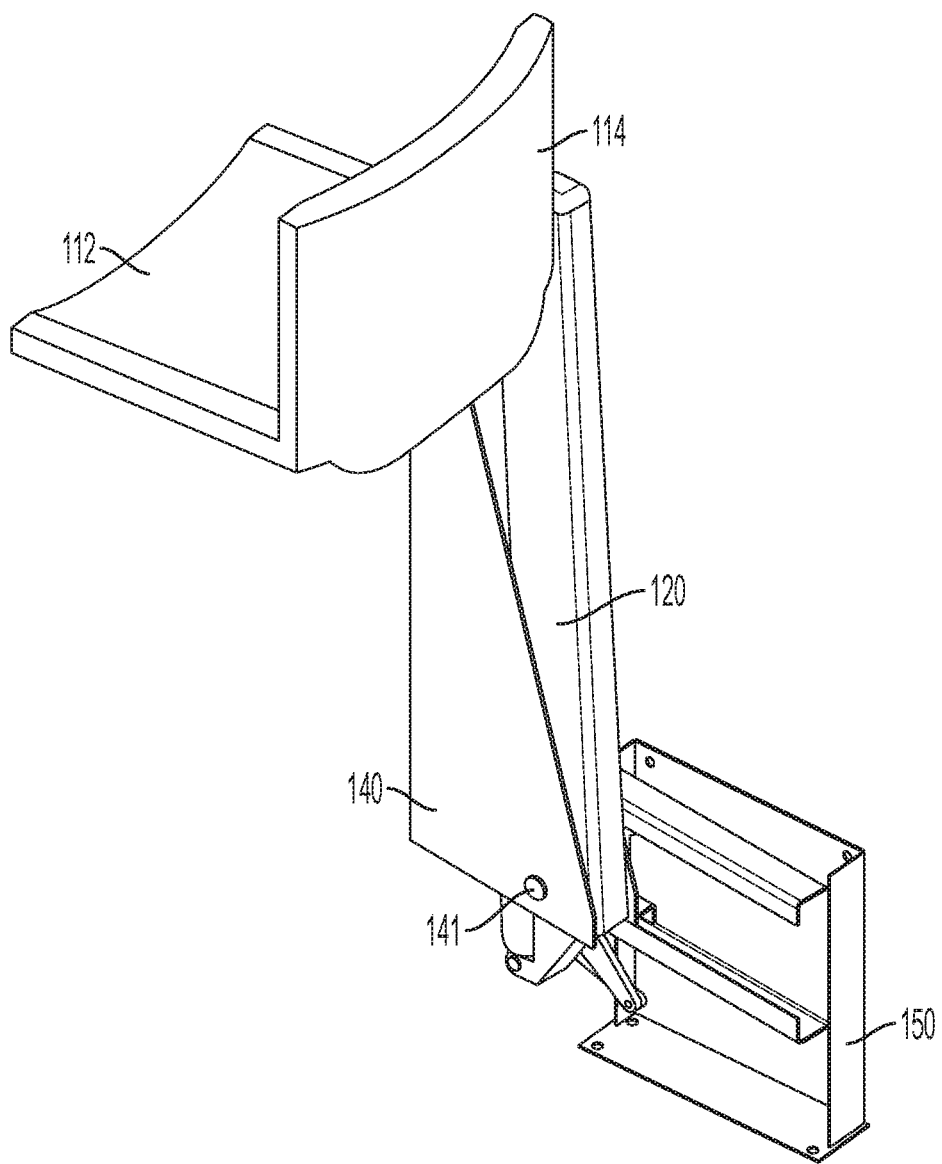
FIG. 4 shows a rear right side, upper perspective view of the apparatus of a preferred embodiment of the present invention, separate from the vehicle, and in the upper, unfolded, ready-for-use position.
Figure 5:
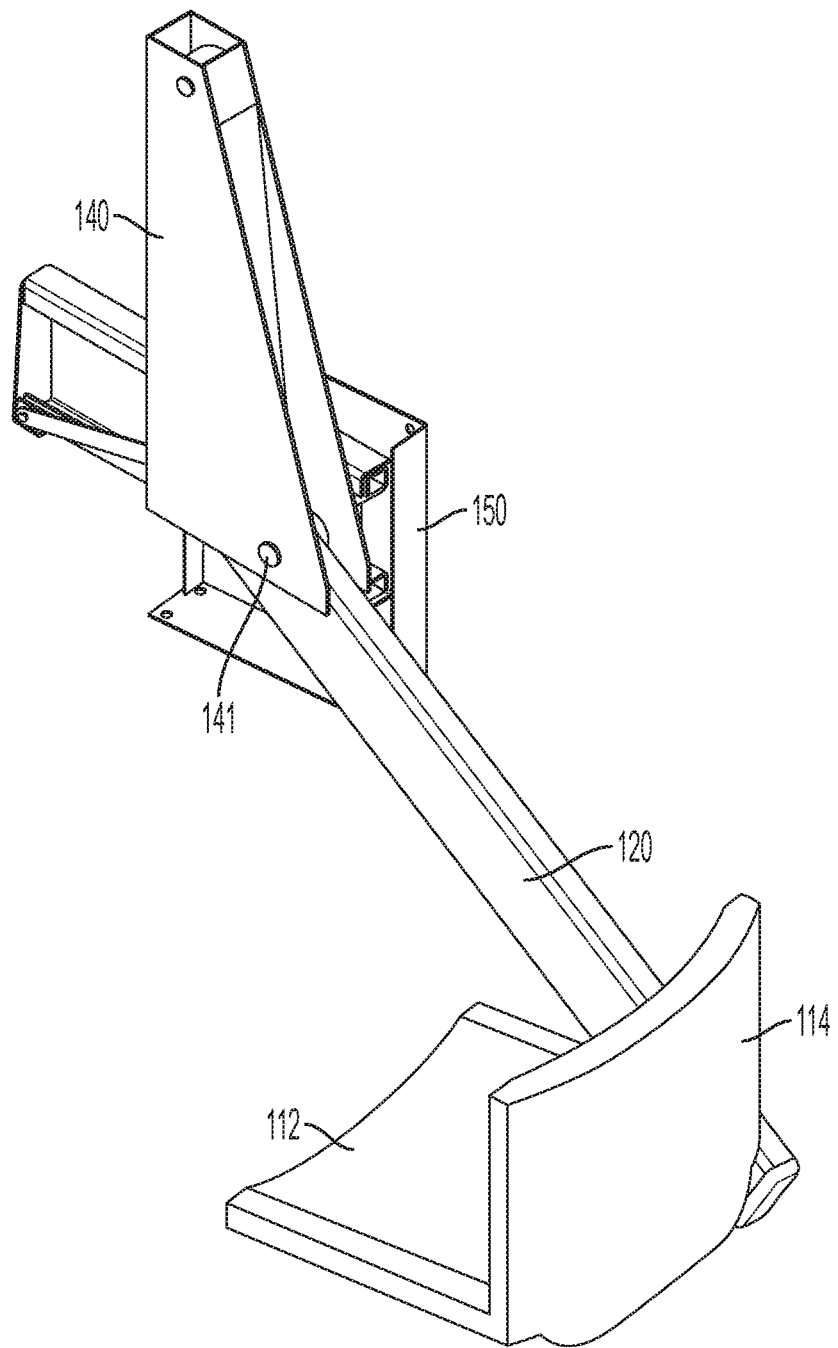
FIG. 5 shows a rear, right side, upper perspective view of the apparatus of FIG. 4, in the lower, unfolded, ready-for-use position, with the seat not rotated toward the door opening and ground.
Figure 6:
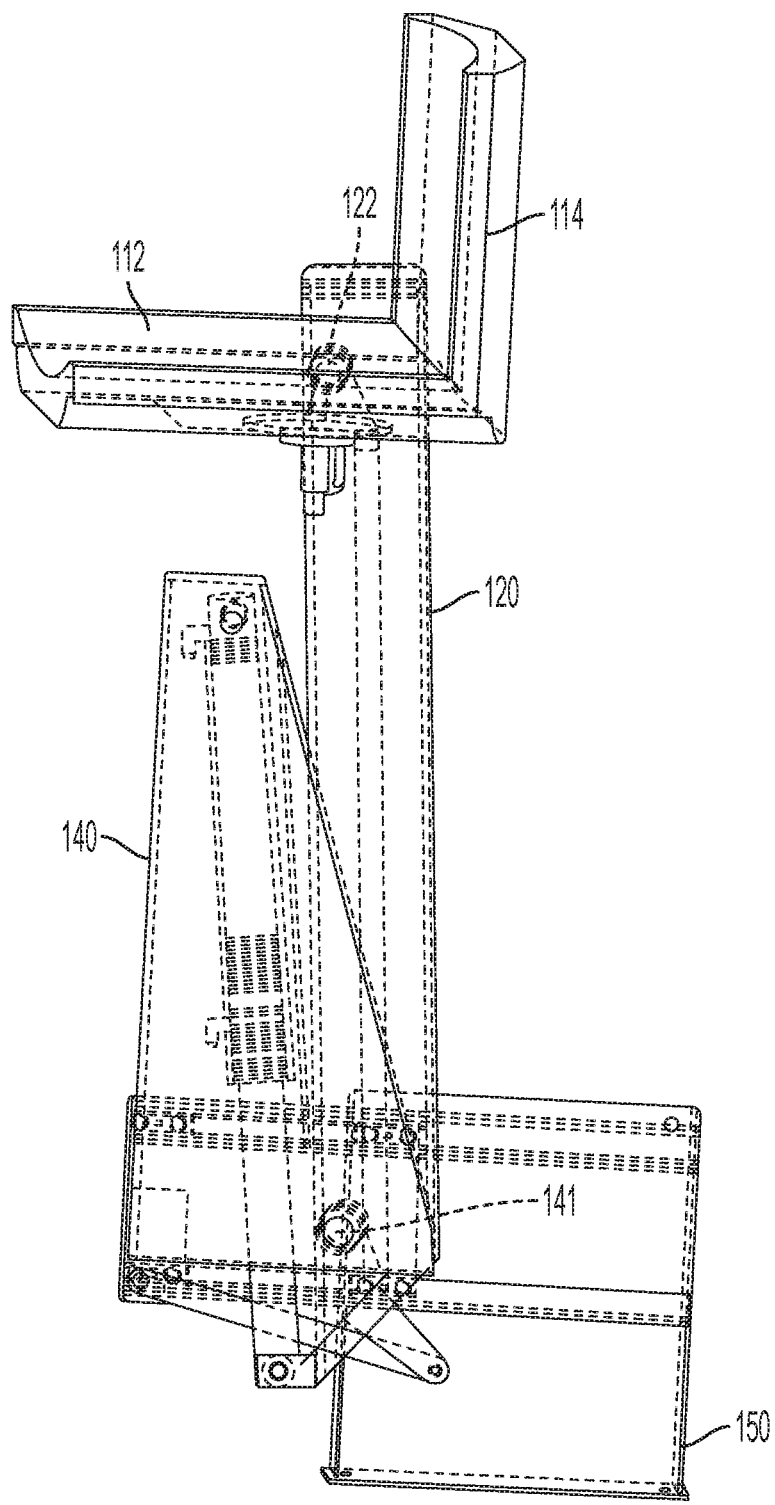
FIG. 6 shows a rear view of the apparatus of FIG. 4 in the orientation of that figure, with internal drive assembly and synchronization elements shown in phantom.
Figure 7:
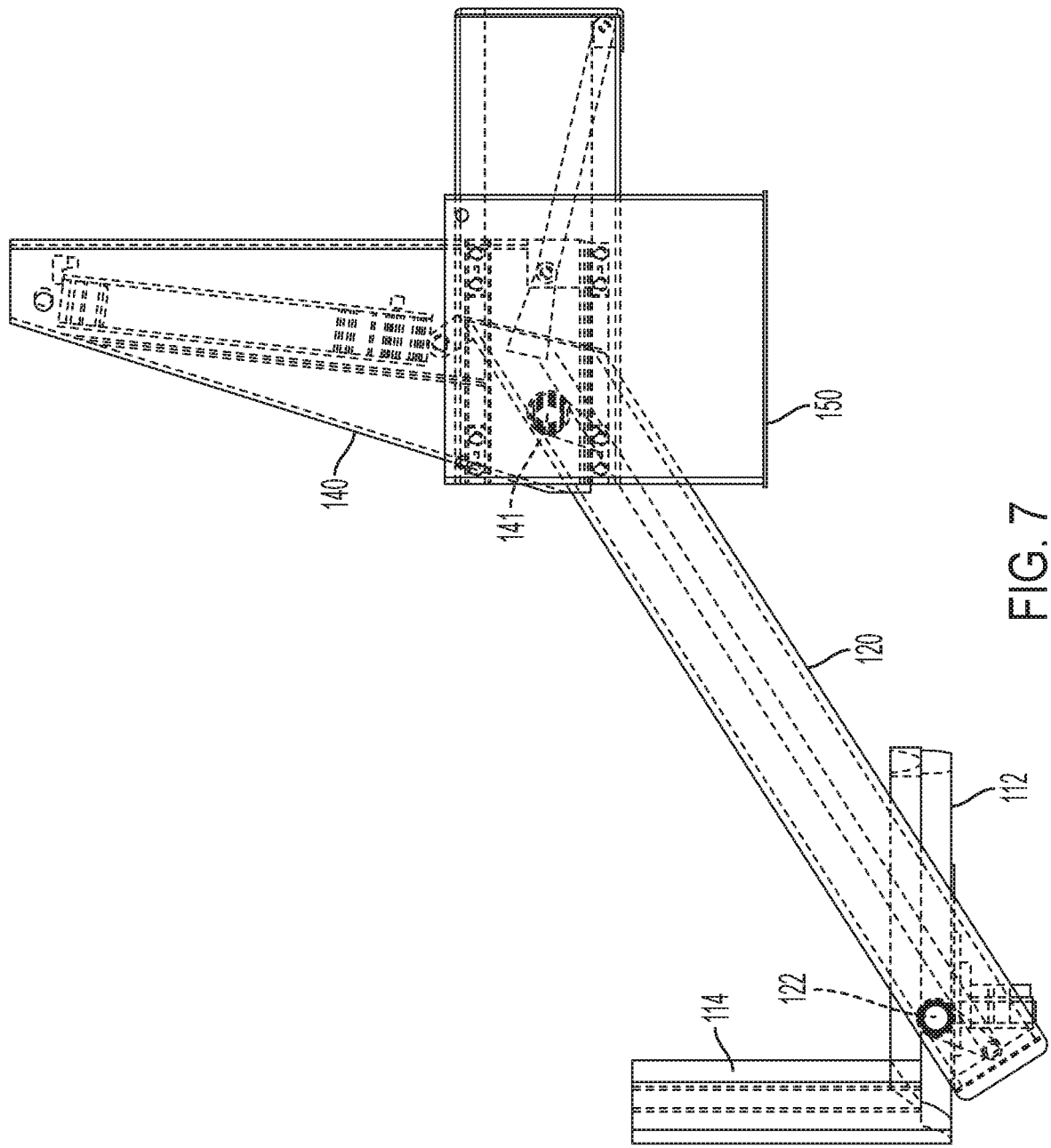
FIG. 7 shows a front view of the apparatus of FIG. 4 in the orientation of FIG. 5, with internal drive assembly and synchronization elements shown in phantom.
Figure 8:
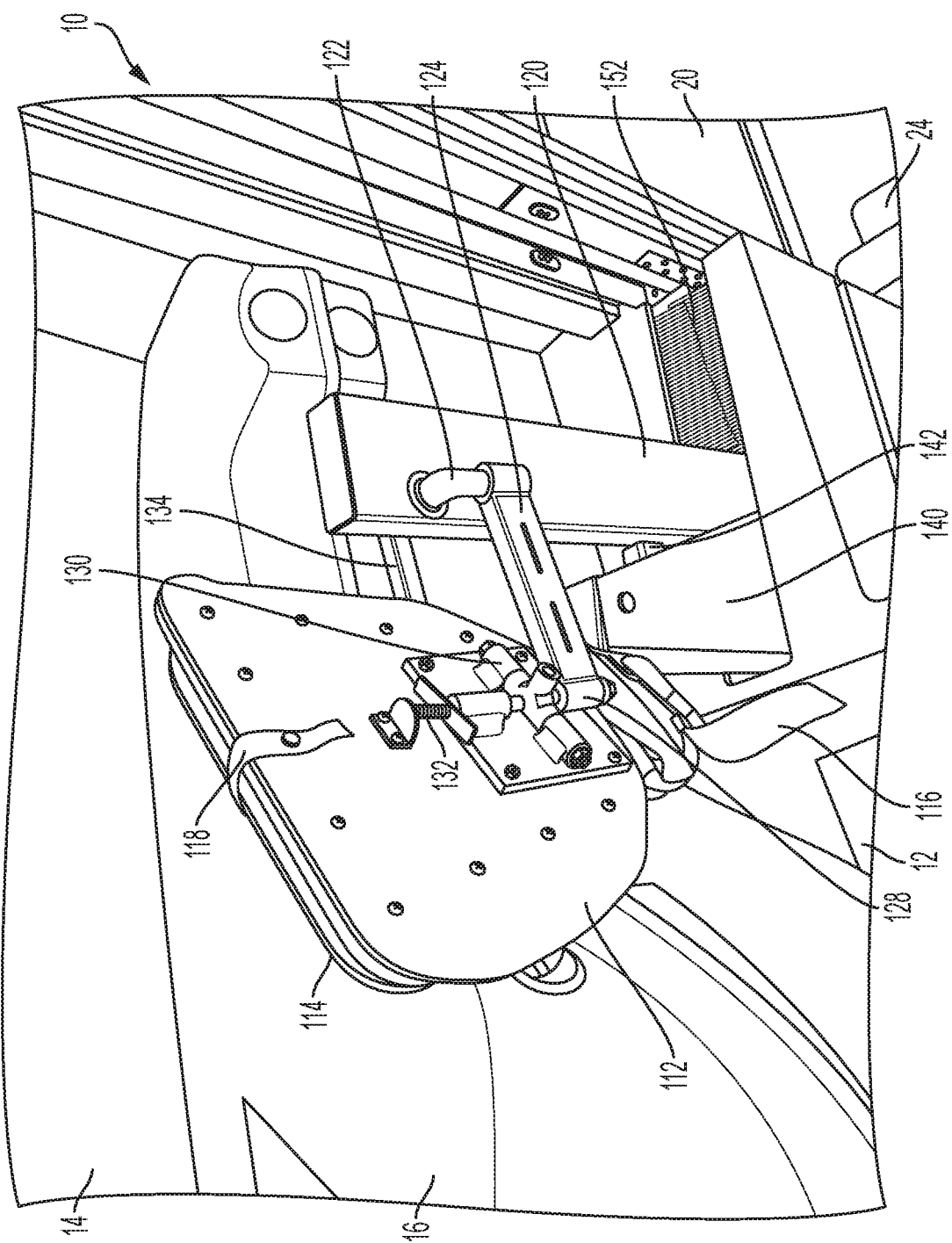
FIG. 8 shows a rear upper perspective view of another preferred embodiment of the present invention, as mounted in a motor home.
Figure 9:
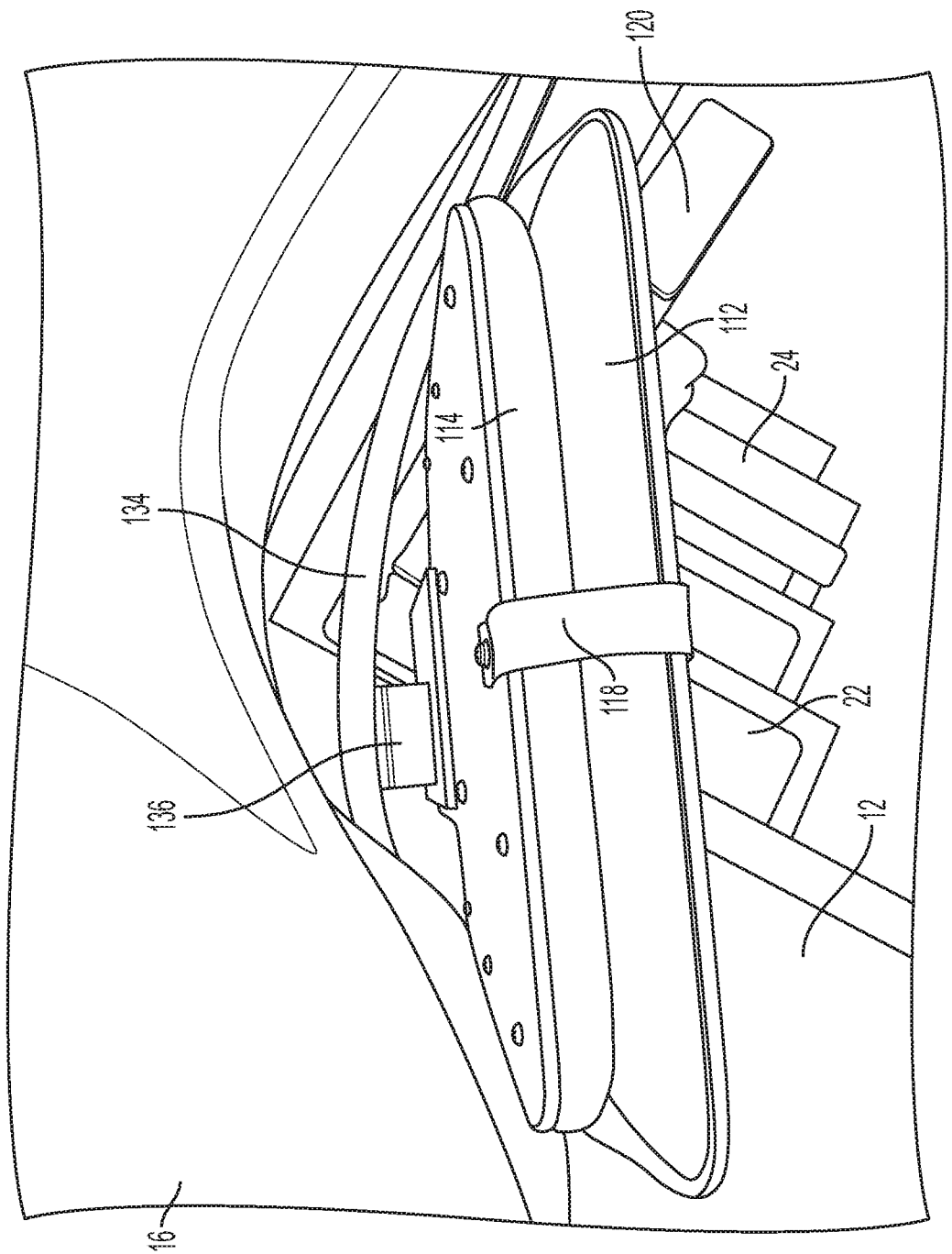
FIG. 9 shows a top view of the lift seat portion of the embodiment of FIG. 8, as folded for storage.
Figure 10:
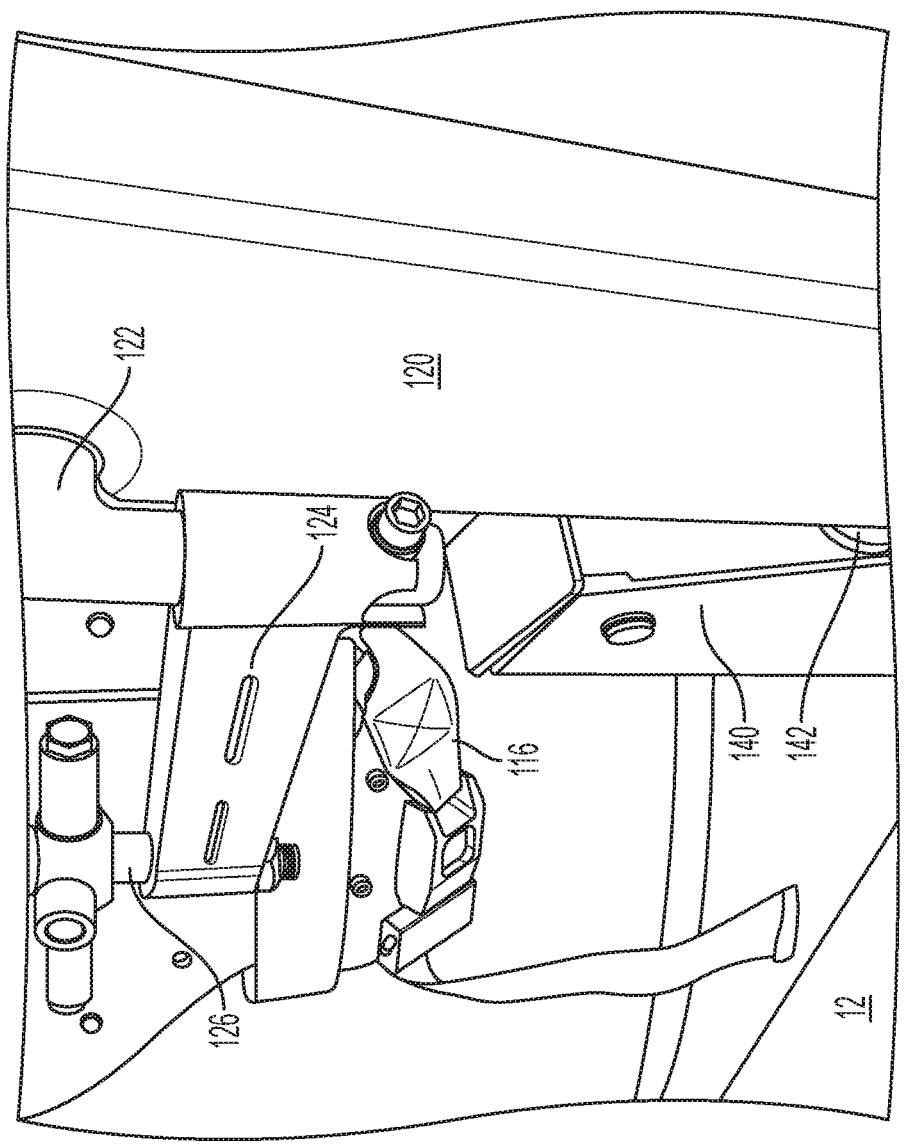
FIG. 10 shows a rear, right side perspective view of the portion of the embodiment of FIG. 8 connecting the lift seat portion with the lifting arm, with the seat arm in the orientation of FIG. 8.
Figure 11:
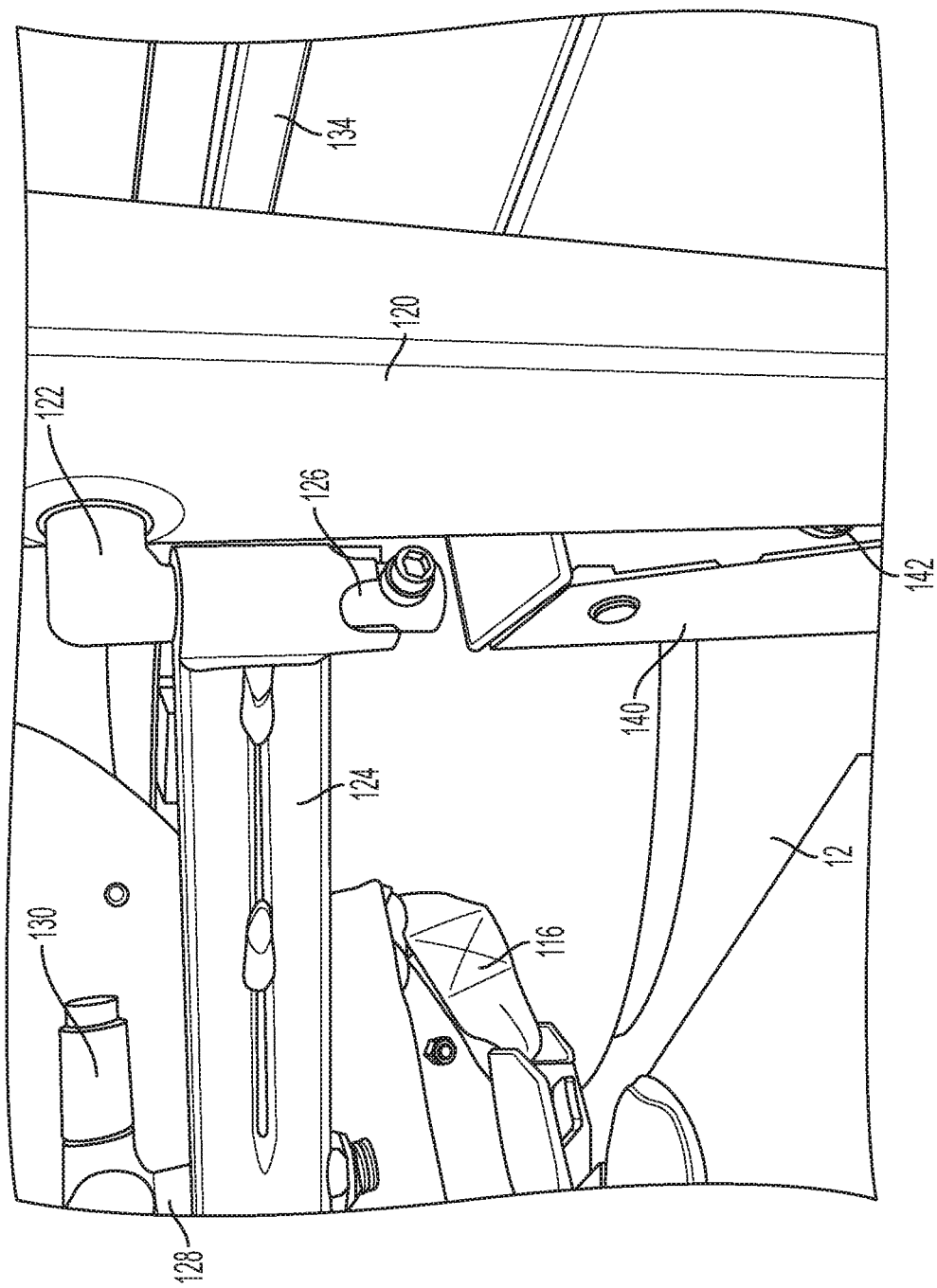
FIG. 11 shows a rear, right side perspective view of the portion of FIG. 10, as the lift seat portion is rotated away from the storage position by movement of the seat arm.
Figure 12:
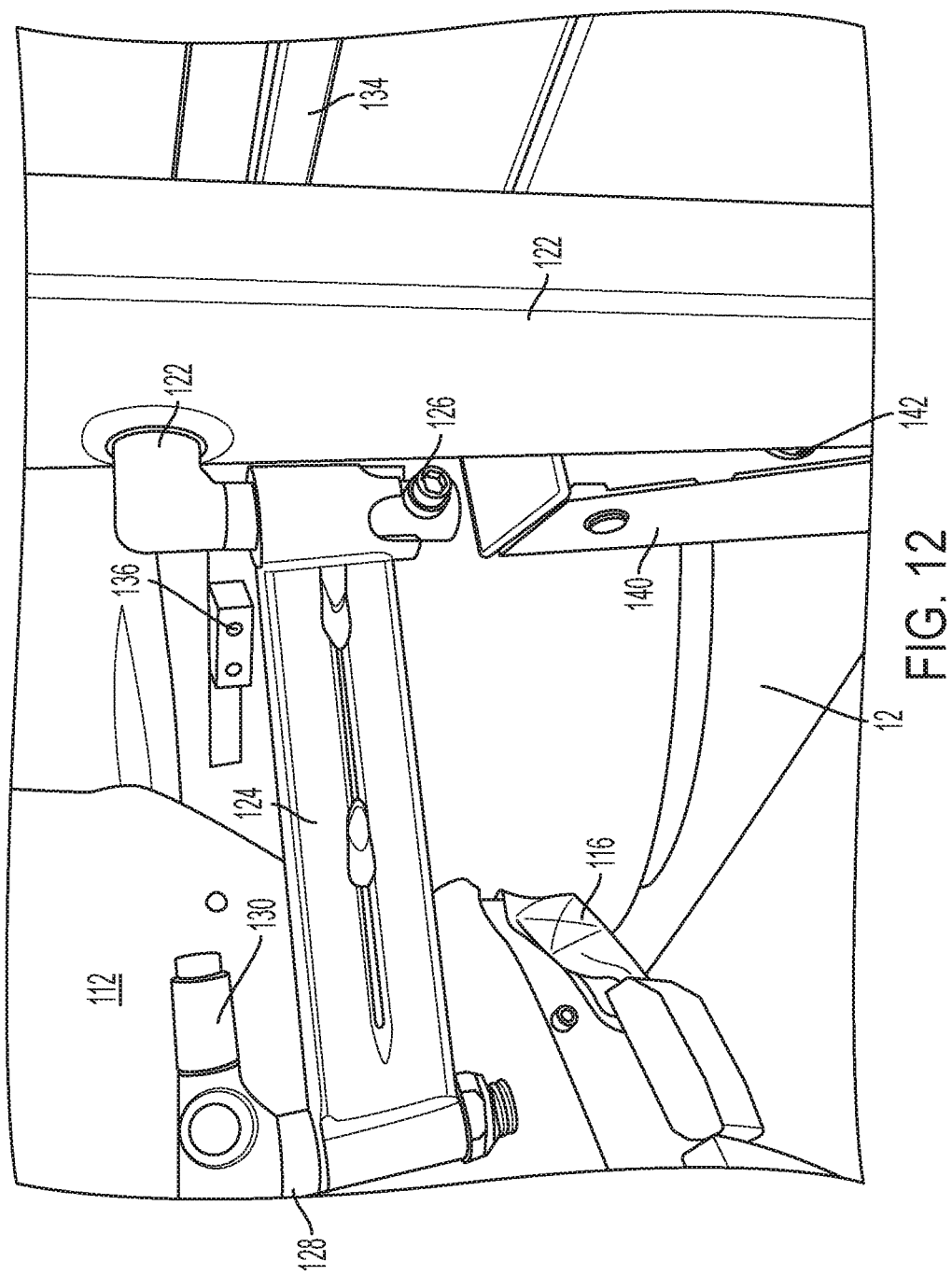
FIG. 12 shows a rear, right side perspective view of the portion of FIG. 10 as the lift seat portion is rotated into the usage position adjacent the front passenger seat by movement of the seat arm.
Figure 13:
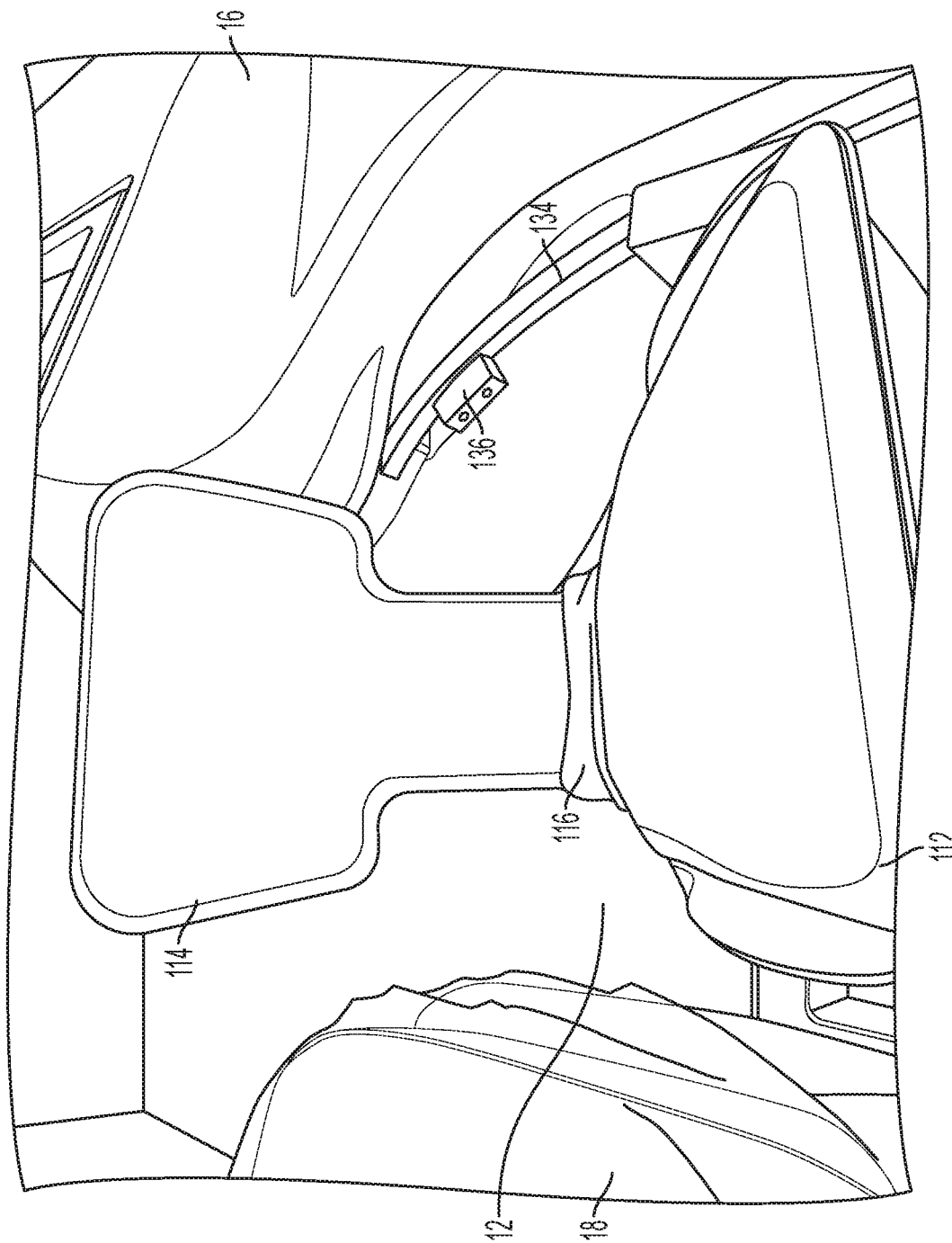
FIG. 13 shows a right side, upper perspective view of the lift seat portion of FIG. 8, as the lift seat is unfold for use, when the seat arm is rotated into the orientation of FIG. 12 and the lift seat is facing the vehicle door
Figure 14:
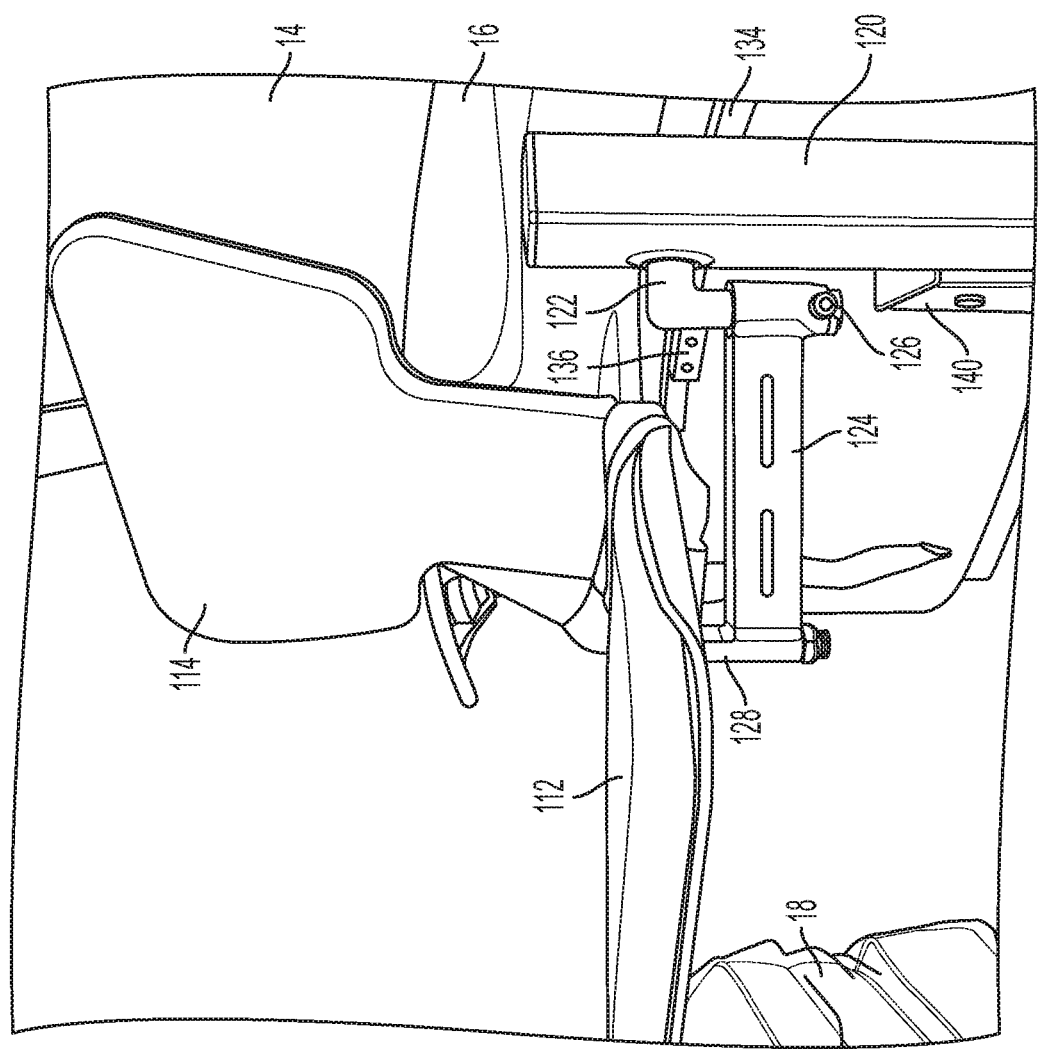
FIG. 14 shows a right side view of the lift seat portion of FIG. 8, when the lift seat is unfolded for use, the seat arm is rotated as in FIG. 12, and the lift seat is then rotated toward the passenger seat with respect to the seat arm.
Figure 15:
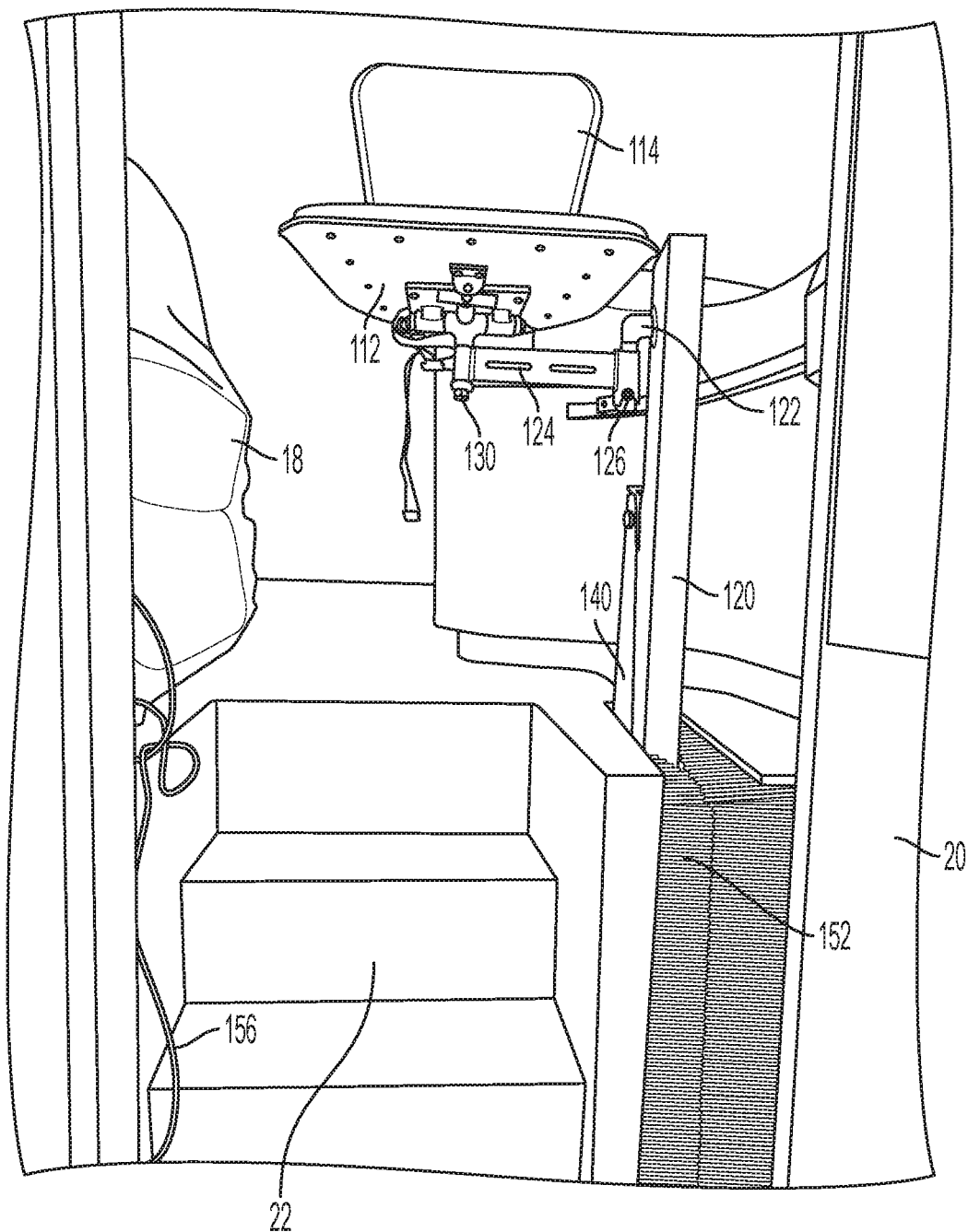
FIG. 15 shows a right side, lower perspective view of the embodiment of FIG. 8, when the lift seat is fully unfolded for use, the seat arm is in the orientation of FIG. 12, and the lift seat is rotated toward the vehicle door with respect to the seat arm, and the vehicle door is opened.
Figure 16:
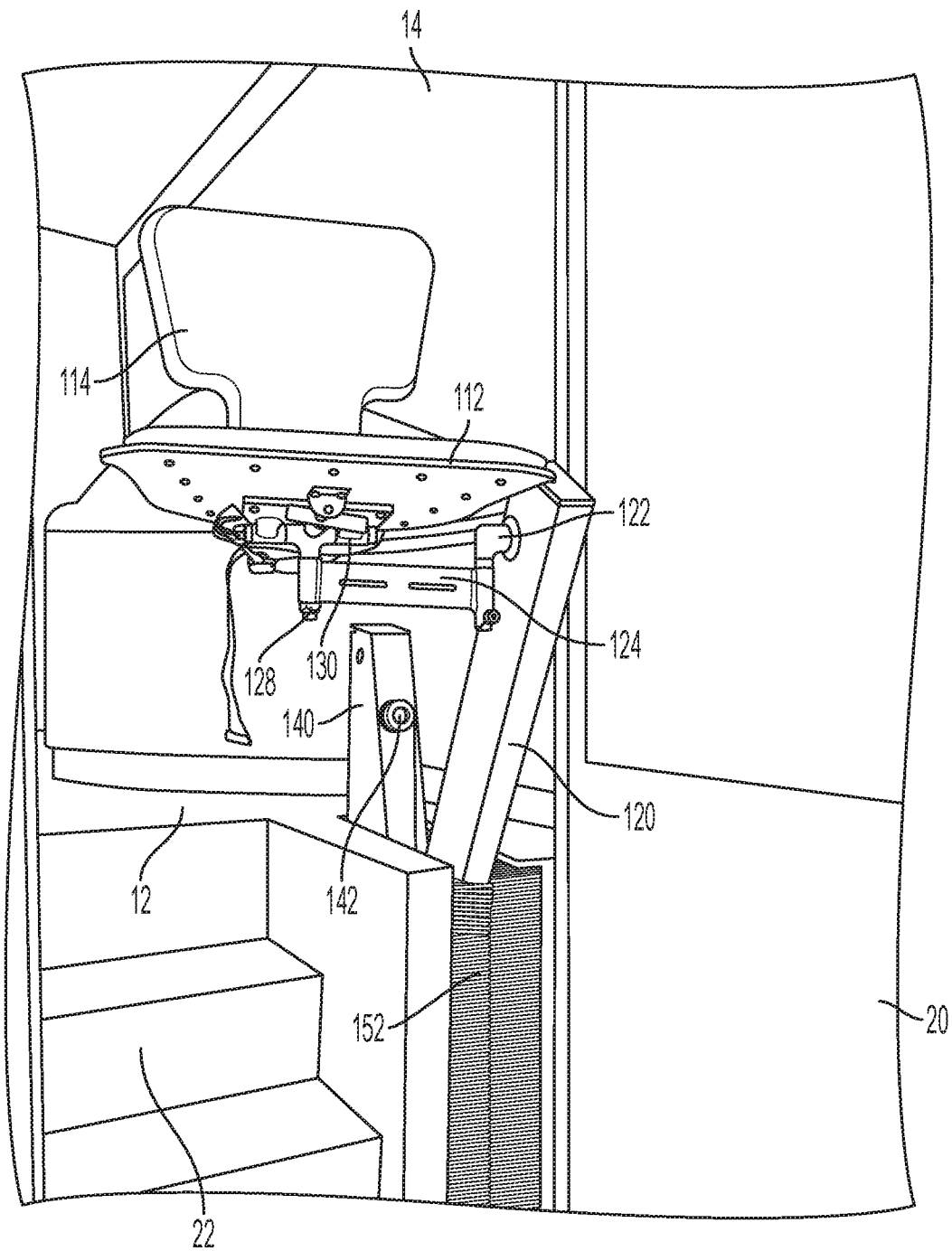
FIG. 16 shows a rear, right side, lower perspective view of the embodiment of FIG. 8 in the orientation of FIG. 15, as the lift seat is being moved toward the vehicle door and lowered toward the ground.
Figure 17:
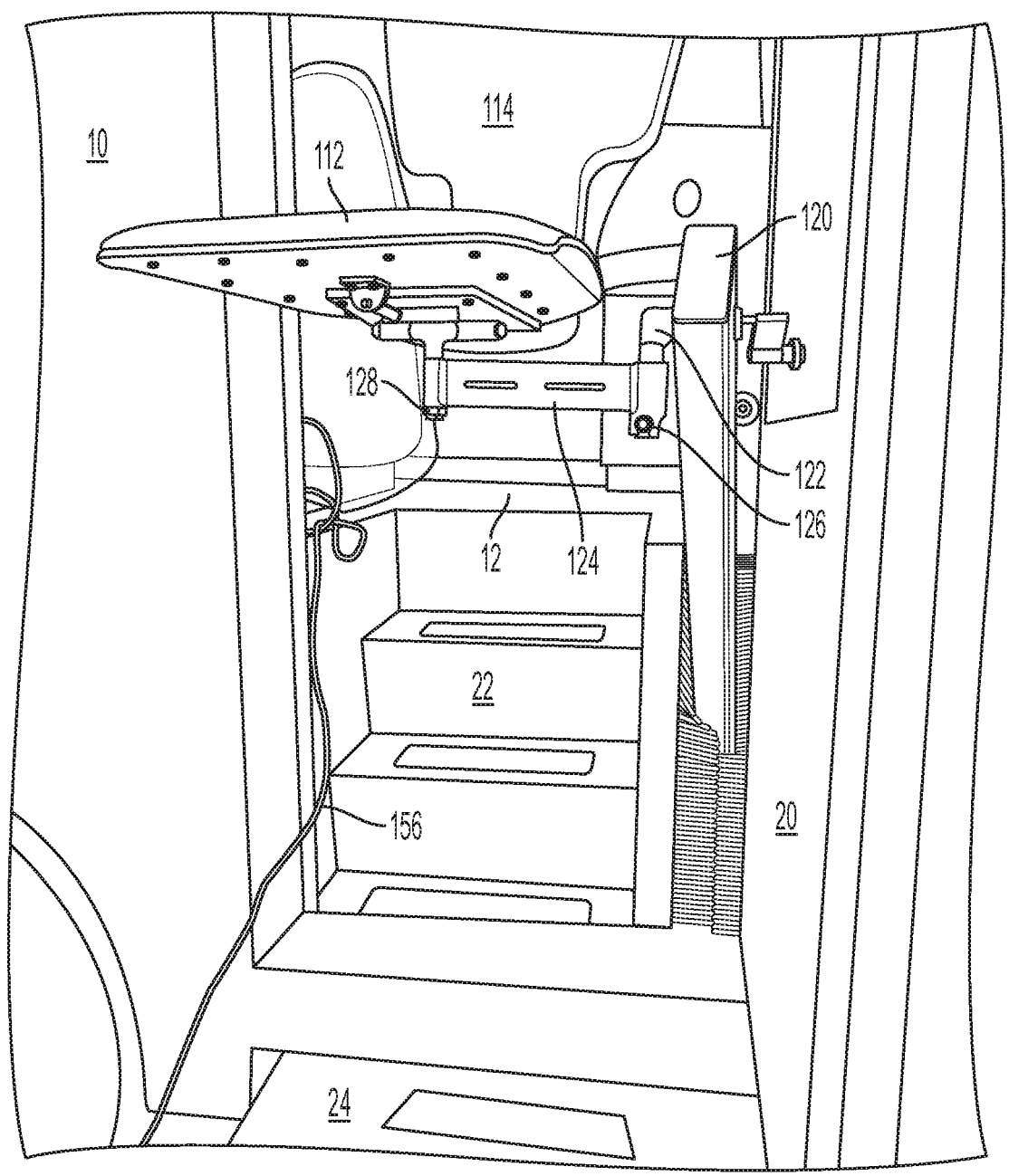
FIG. 17 shows a right side, lower perspective view of the embodiment of FIG. 8, as the lift seat is being further moved through the vehicle door from the view of FIG. 16.
Figure 18:
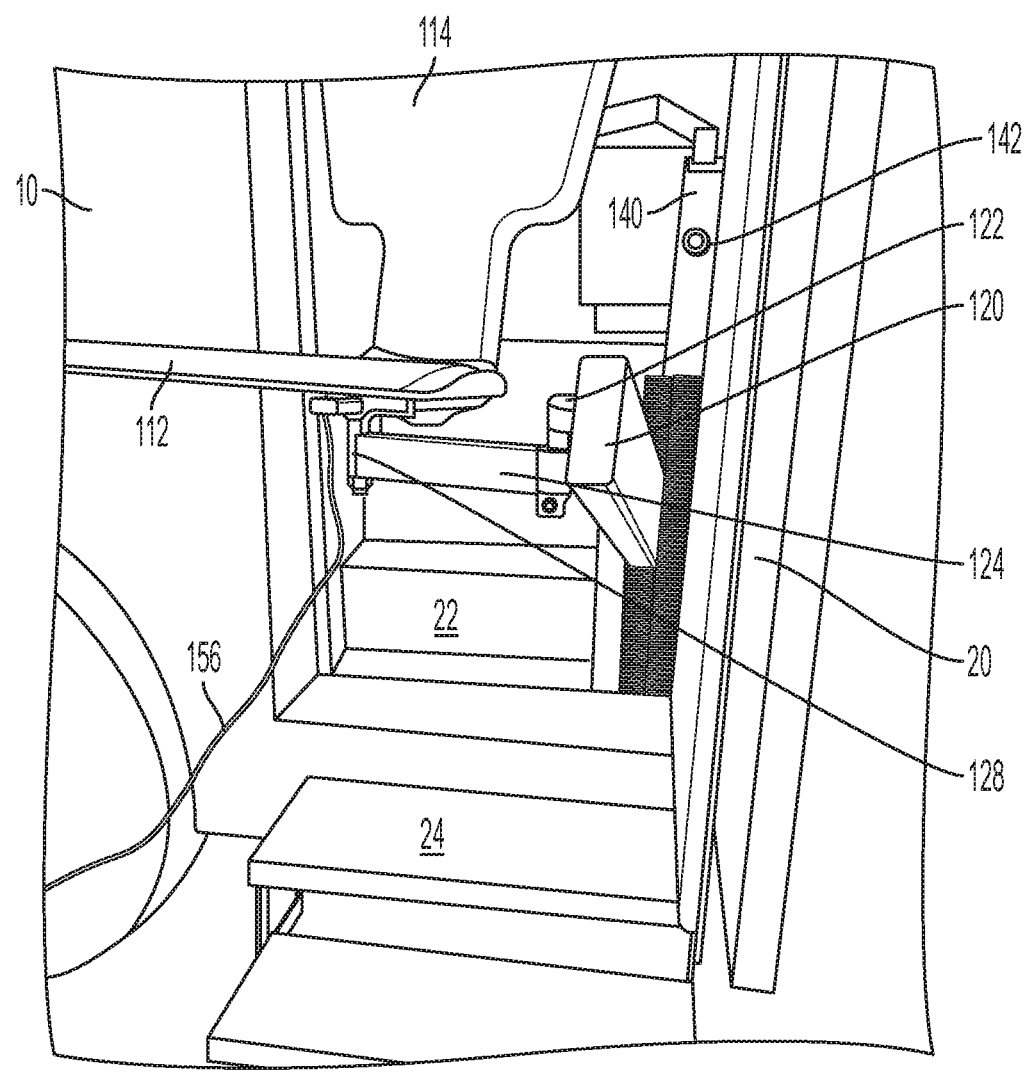
FIG. 18 shows a right side, lower perspective view of the embodiment of FIG. 8, as the lift seat is being still further moved through the vehicle door from the view of FIG. 16.
Figure 19:
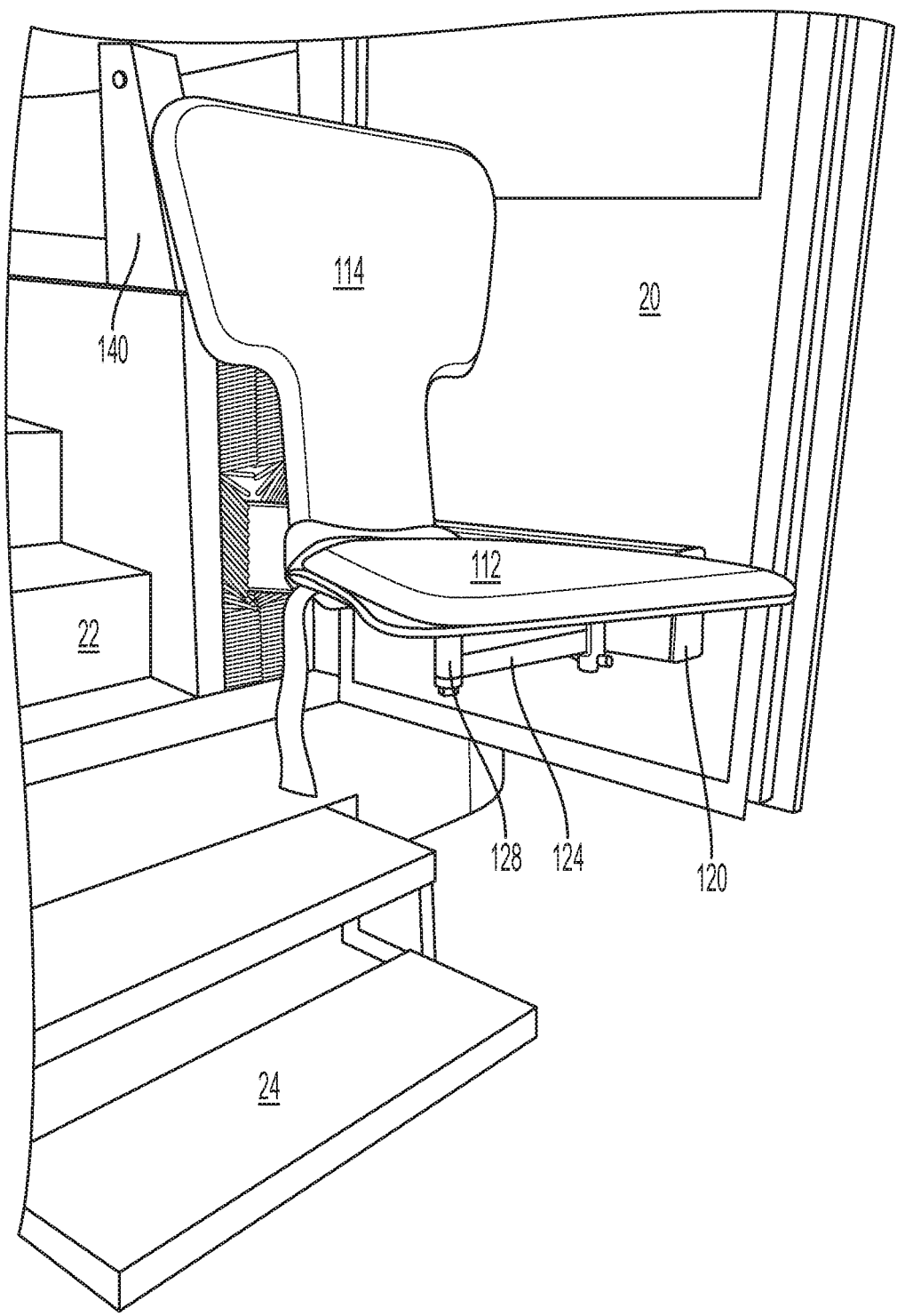
FIG. 19 shows a rear, right side perspective view of the embodiment of FIG. 8, as the lift seat is being still further moved toward the ground from the view of FIG. 18.
Figure 20:
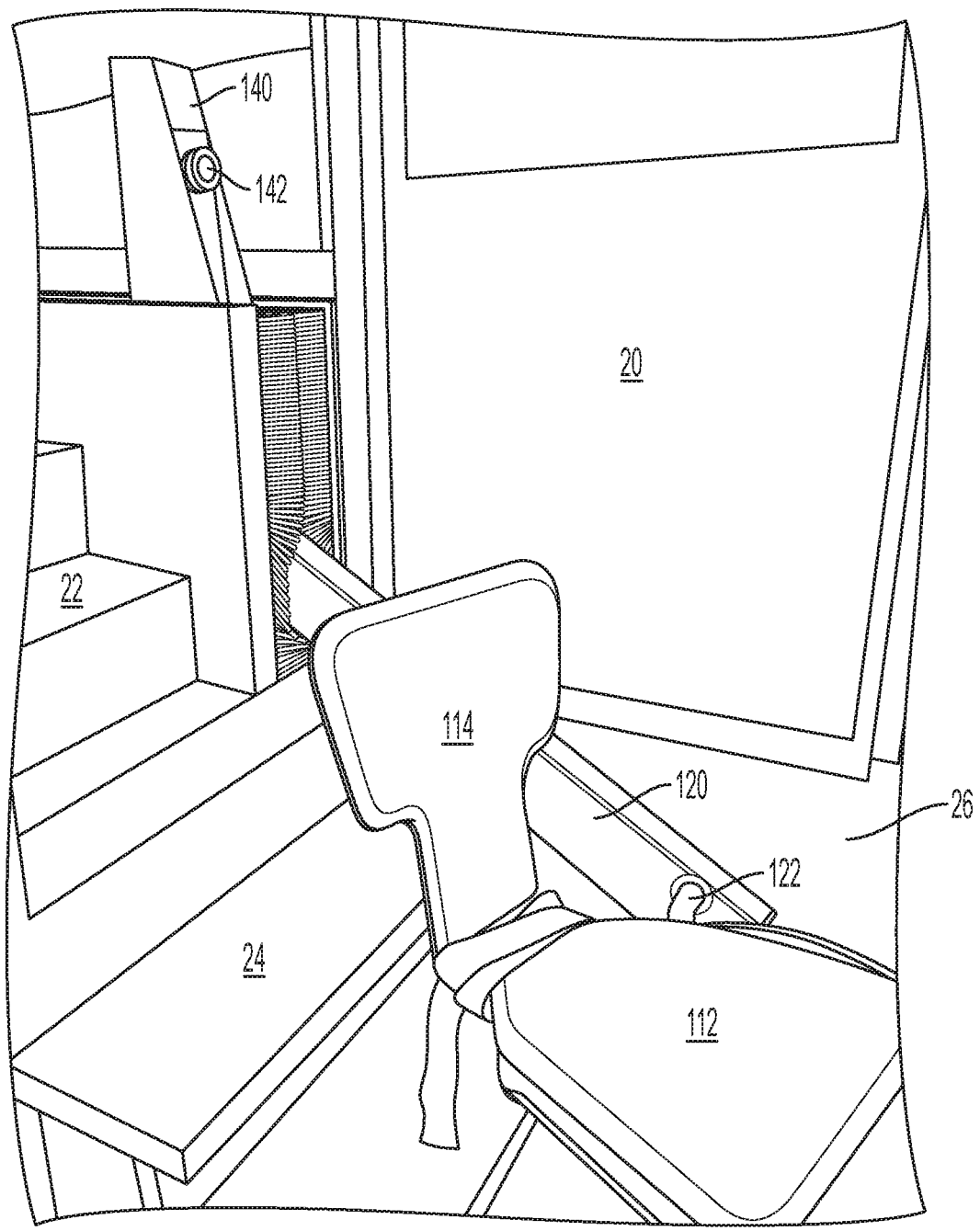
FIG. 20 shows a rear, right side, upper perspective view of the embodiment of FIG. 8 when the lift seat is moved to the ground position.
Figure 21:
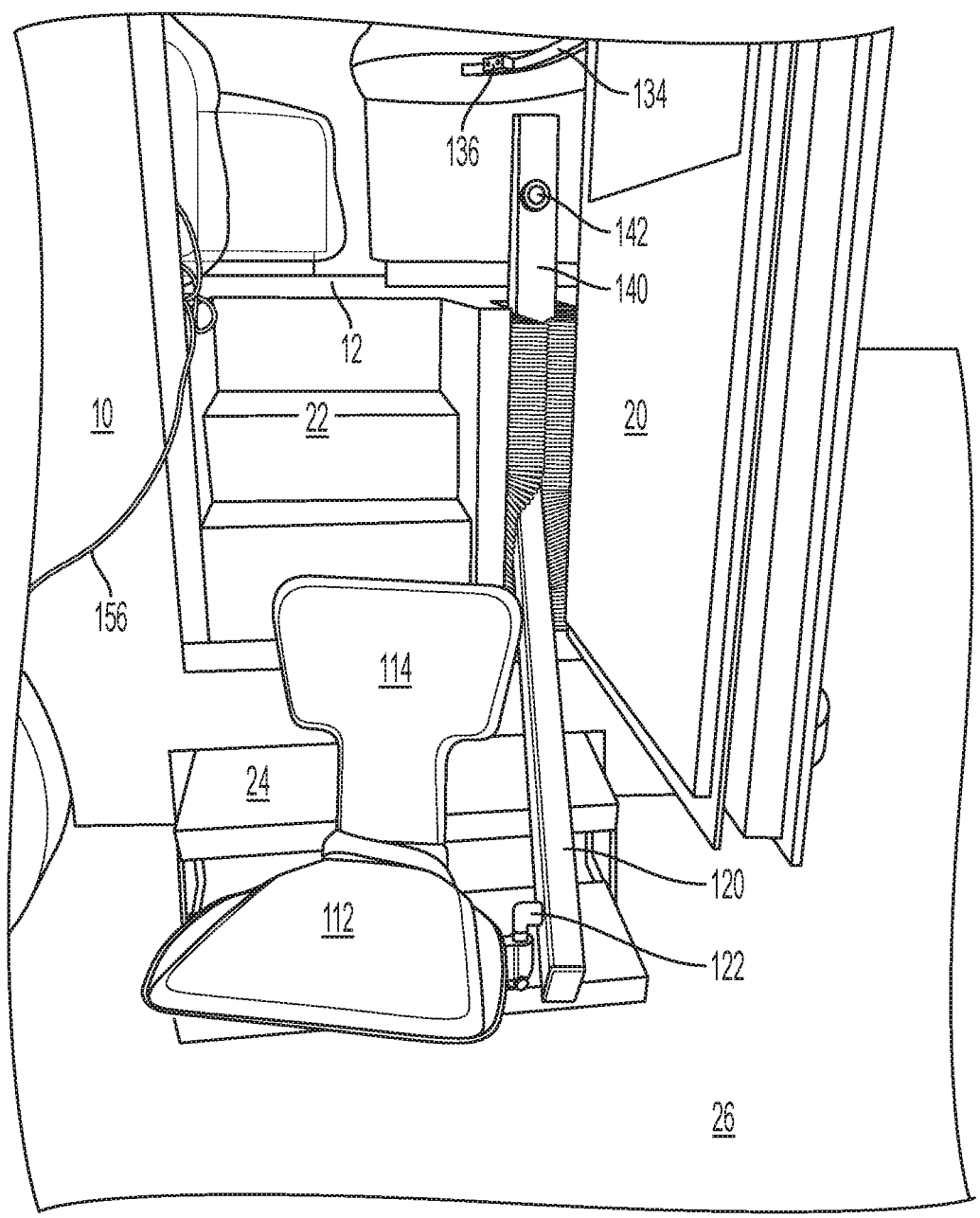
FIG. 21 shows a right side view of the embodiment of FIG. 8 in the ground position.
Figure 22:
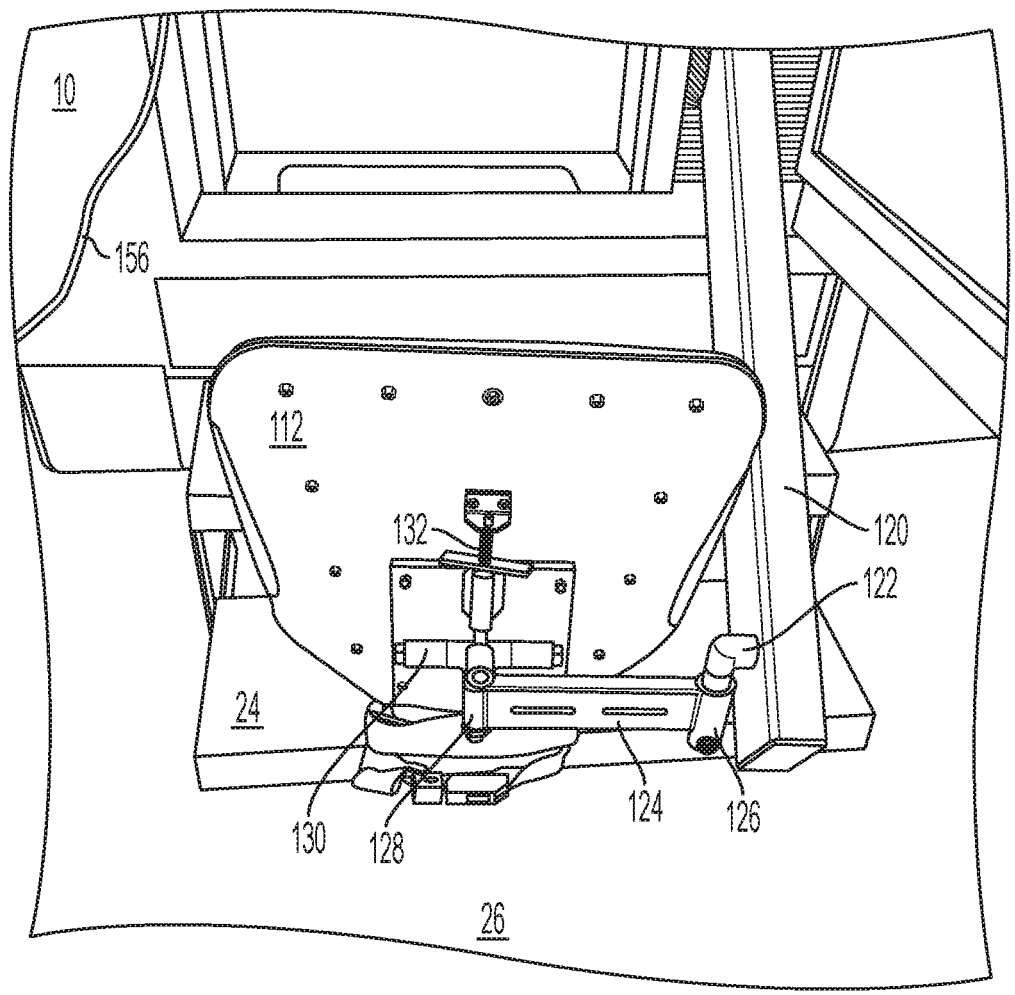
FIG. 22 shows a right side view of the embodiment of FIG. 8, when the lift seat is released for upward rotation with respect to the seat arm, in preparation for return storage in the vehicle.
Figure 23:
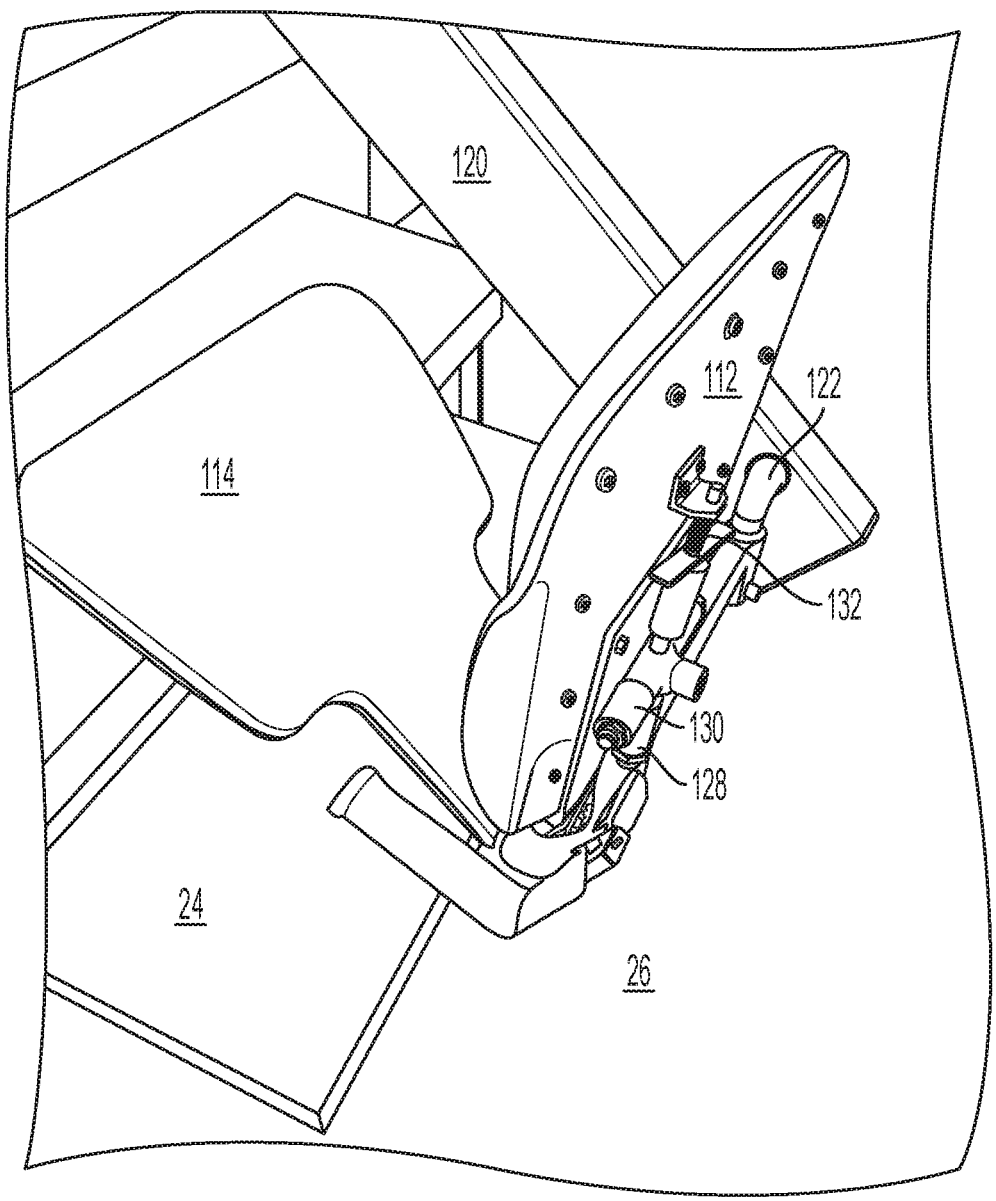
FIG. 23 shows a rear, right side, upper perspective view of the embodiment of FIG. 8, in the orientation of FIG. 22.

The drawings are not to scale from one figure to the next.

DETAILED DESCRIPTION OF PREFERRED EMBODIMENTS

The drawings show various embodiments of the present invention both schematically, as separate from a particular vehicle, and as in preferred embodiments mounted within a vehicle. Various vehicular and non-vehicular applications of the present invention are specifically envisioned, but for purposes of illustration, a motor home application is presented herein.

The following features are shown in the drawings:
a vehicle, specifically a motor home 10, having
    a passenger floor 12,
    a front window 14,
    a dashboard 16,
    a front passenger seat 18,
    a front passenger door 20,
    internal steps 22, and
    external steps 24 adjacent to ground level 26,
an apparatus 100 having
    a lift seat 110 comprising:
        a seat base 112,
        a seat back 114 hinged to the seat base,
        a seat belt 116 connected to the lift seat for restraining a user from unwanted sliding out of the seat,
        a storage strap 118 for releasably holding the seat base to the seat back
    a lift arm 120, movable between elevated and depressed positions,
    a pivot arm 122 which is rotatable with respect to the lift arm,
    a seat arm 124 connecting the seat base to the pivot arm through a releasable lock assembly 126,
    a vertical pivot shaft 128 rotatably connecting the seat base to the seat arm, to allow rotation of the lift seat in a generally horizontal plane during use,
    a horizontal pivot shaft 130 rotatably connection the seat base to the vertical pivot shaft, to allow rotation of the seat base vertically away from a horizontal plane during storage,
    a spring biased release handle 132 which selectively locks the seat base to the vertical pivot shaft, to control rotatability about the horizontal pivot shaft,
    a guard rail 134 mounted on the dashboard,
    a dashboard bumper 136 mounted on the guard rail,
    a base member 140 to which the lift arm is rotatably mounted at pivot 141,
    a stop member 142 connected to the base member to cushion and restrain further upward rotation of the lift arm against the base member, typically when the lift arm is in its highest desired elevated position, a track member 150 to which the base member is slidably attached, the track member preferably being mounted to the motor home at a location below the passenger floor, flexible guard elements 152 connected at the passenger floor to shield the track member from debris falling from the passenger floor, a drive assembly (unnumbered) within and/or adjacent the track member and/or the base member for moving the base member along the track member and rotating the lift arm with respect to the base member, and a user actuated interface 156 for controlling operation of the drive assembly.

In operation, the lift seat is moved from a folded storage position, adjacent the dashboard and low with respect to the front window, toward an opened position adjacent the front passenger seat. This first use position is elevated above the passenger floor sufficiently to be convenient and easy for a passenger in the front passenger seat to slide onto the lift seat, and fasten on the seat belt. After that, the user would open the vehicle door and turn to face that opening, rotating the lift seat about the vertical pivot shaft. Then, the user would actuate the drive assembly via the user actuated interface. This drive assembly can be of any desired conventional nature, including electric or hydraulic motors. The user interface can be of any desired conventional nature as well, including a control button on a cable, as shown in the figures, or a wireless control actuated from a cell phone application. The pivot arm is preferably synchronized with respect to the lift arm such that the seat base remains substantially horizontal as the lift arm moves from its elevated first use position to its depressed second position, where the lift seat is adjacent the ground. This synchronization can be obtained by any desired conventional means, including drive chains, tensioned cables, and the like.

Although the present invention has been shown and described herein with respect to certain preferred embodiments and alternative configurations, those were by way of illustration and example only. For example, the present invention can be applied with a removable lift seat, that is stored under the front passenger seat or in a dashboard compartment. Further, the dashboard can be formed with elements to cover the lift seat portion when it is not in use. Also, the track member can be mounted directly on the passenger floor in retrofit versions of the present invention, with the lift arm and/or base member incorporating telescopic extensions for a full range of motion into and out of the vehicle door. In addition, the present invention can be adapted for use with the front driver seat or other vehicular seat, in other embodiments. Accordingly, the spirit and scope of the present invention is intended to be limited only by the terms of the appended claims.

What is claimed is:

1. An apparatus comprising:
    a seat base,
    a lifting arm connected to the seat base,
    a base member to which the lifting arm is rotatably attached such that the lifting arm can rotate, and
    a track member to which the base member is slidably attached such that the base member is configured to slide along the track member along a horizontal direction,
    wherein the seat base is rotatable around the track member, via the lifting arm, between a first position and a second position, wherein the first position is elevated with respect to the second position, wherein the lifting arm extends longitudinally in a vertical direction that is perpendicular to the horizontal direction when the seat base is in the first position, wherein the seat base is positioned below the track member in the second position.

2. The apparatus according to claim 1 wherein the lifting arm is connected to the seat base such that the seat base remains in a given horizontal orientation as the seat base is moved between the first and second positions.

3. The apparatus according to claim 2 wherein the lifting arm is connected to the seat base such that the seat base is rotatable within the given horizontal orientation as the seat base is moved between the first and second positions.

4. The apparatus according to claim 3 wherein the lifting arm is connected to the seat base such that the seat base is selectively rotatable vertically out of the given horizontal orientation when the seat base is not occupied.

5. The apparatus according to claim 4 wherein a seat back is rotatably connected to the seat base so as to move between a position adjacent the seat base and a position substantially orthogonal to the seat base.

6. The apparatus according to claim 1 wherein the track member is mounted within a vehicle, that vehicle having a front passenger seat, and the track member is mounted such that the seat base is adjacent to the front passenger seat when the seat base is in the first position.

7. The apparatus according to claim 6 wherein the track member is mounted within the vehicle such that the seat base extends out of the vehicle and adjacent to ground level when the seat base is in the second position.

8. The apparatus according to claim 7 wherein the vehicle has a passenger door, and the track member is mounted adjacent to the passenger door.

9. The apparatus according to claim 8 wherein the vehicle has a front window, and the track member is mounted between the front passenger seat and the front window.

10. The apparatus according to claim 9 wherein the seat base is movable with respect to the lifting arm such that when the seat base is not occupied it does not obstruct the view of through the front window from an occupant of the front passenger seat.

11. The apparatus according to claim 10 wherein the seat base, lifting arm, base member, and track member are movable and mounted such that when the seat base is not occupied, passage of the occupant from the front passenger seat through the passenger door is not obstructed.

12. The apparatus according to claim 11 wherein a motive drive assembly is connected to the lifting arm and base member, and motion of the base member relative to the track member are controlled by a user actuated interface of the motive drive assembly.

13. The apparatus according to claim 6 wherein the vehicle has a passenger floor at a given elevation and the track member is mounted to the vehicle below the elevation of the passenger floor, and the seat base extends above the elevation of the passenger floor when in the first position and extends below the elevation of the passenger floor when in the second position.

14. The apparatus according to claim 1 wherein the base member is linearly fixed to the lifting arm.

15. A recreational vehicle comprising:
    a passenger floor positioned at an elevation;
    a front passenger seat coupled to the passenger floor; and
    a chair lift assembly including:
        a seat base having a seating surface,
        a lifting arm coupled to the seat base, a base member to which the lifting arm is rotatably coupled such that the lifting arm can rotate, and a track member to which the base member is slidably coupled such that the base member is configured to slide along the track member, wherein the seat base is rotatable around the track member, via the lifting arm, between a first position in which the seat base is positioned above the elevation and a second position in which the seating surface is positioned below the elevation.

16. The recreational vehicle of claim 15, wherein the track member is mounted within the recreational vehicle below the elevation.

17. The recreational vehicle of claim 15, wherein the track member is mounted such that the seat base is adjacent to the front passenger seat when the seat base is in the first position.

18. The recreational vehicle of claim 15, wherein the seat base is rotatably rotatable coupled to the lifting arm.

19. The recreational vehicle of claim 15, wherein the seat base is coupled to the lifting arm such that the seat base can rotate around two different axes with respect to the lifting arm.

20. The recreational vehicle of claim 15, wherein the chair lift assembly includes a motor-driven drive assembly operably coupled to the lifting arm and the base member to move the seat base between the first position and the second position.

* * * * *